June 30, 1964 R. T. LAMB 3,139,489
TAPE STABILIZING MEANS
Filed April 11, 1960 3 Sheets-Sheet 1

REGINALD T. LAMB
INVENTOR.
BY Harvey G. Lowhurst
ATTORNEY

REGINALD T. LAMB
INVENTOR.
BY Harvey G. Lowhurst
ATTORNEY

June 30, 1964 R. T. LAMB 3,139,489

TAPE STABILIZING MEANS

Filed April 11, 1960 3 Sheets-Sheet 3

REGINALD T. LAMB
INVENTOR.

BY Harvey G. Lowhurst

ATTORNEY

United States Patent Office 3,139,489
Patented June 30, 1964

3,139,489

TAPE STABILIZING MEANS

Reginald T. Lamb, Palo Alto, Calif., assignor to Ampex Corporation, Redwood City, Calif., a corporation of California Filed Apr. 11, 1960, Ser. No. 21,186
7 Claims. (Cl. 179—100.2)

The present invention relates to magnetic tape recorders and, in particular, to a magnetic tape guide for providing uniform recording conditions.

In general, magnetic tape recorders comprise a magnetic head for recording information on magnetic tape as the tape is transported from a supply reel to a take-up reel. In one type of recorder, for example, the tape is guided in one direction about the surface of a cylinder along a helical path with the recording head revolving in a slot of the cylinder. The head then writes on the magnetic tape in a continuous manner along angular paths spaced apart across the width of the tape. Because of the pliant nature of the tape, in this and other systems, the resistance of the tape to the magnetic head is not uniform and results in distortional variations in the recording and consequent distortion in the playback.

It is therefore an object of the present invention to provide a magnetic tape stabilizer.

Another object of the invention is to provide a guide system for pliant magnetic tape in the area of the magnetic head for uniform recording conditions.

A further object of the invention is to provide a stabilizer for pliant magnetic tape for increasing the resistance of the tape in the area of the magnetic recording head.

An additional object of the invention is to provide a stabilizer for magnetic tape with substantially no increase in friction between the tape and the guide cylinder.

Magnetic tape guide devices, in accordance with the present invention, provide stabilization of a pliant magnetic tape through the use of a localized tensioning of the tape in the vicinity of the magnetic head. A pair of protruding flange elements adjacent to but spaced apart from the magnetic head operate in conjunction with the head and the support surface along which the tape is moved to insure uniformity of recording.

In one example of a system in accordance with the present invention, the support cylinder is formed of two fixed portions in spaced-apart relation to provide a slot, within which a magnetic head carrying drum is rotated. Each of the cylinder portions is provided with a plurality or set of pins spaced about the periphery thereof with the distance between the two sets of pins being equal to the width of a magnetic tape to be guided. The configuration of the pins of each cylinder portion is spiraled so that the magnetic tape is guided helically about the surface of the cylinder. For substantially frictionless transport of the tape about the cylinder, compressed air may be fed through the two cylinder portions by means of suitable manifolds to a surface of the magnetic tape to support the tape away from the cylinder surface by a film of air.

In such apparatus, the magnetic tape may be moved about the support cylinder and the magnetic head is rotated within the slot of the cylinder in one direction. In order to properly record, the magnetic head may contact the tape, thereby applying a pressure to the tape. The combination of such pressure exerted against the tape and the pliant characteristic of the tape results in an uneven contact between the recording head and the tape, and this results, in turn, in uneven recording conditions. To minimize the foregoing causes of distortion in recording, thin annular elements are coaxially mounted on each of the cylinder portions at the slot to extend a distance beyond the surface of the cylinder. The extensions provided by the annular elements on either side of the recording head cooperates with the support cylinder and recording head to produce a stiffening of the tape at the recording head and, thereby, an increased resistance to the pressure exerted by the recording head against the tape. Thus, a more uniform recording condition exists. Additionally, the thinness of the annular elements in contact with the tape provides a minimum surface in contact with the tape in the direction of movement thereof. Therefore, because of the position of the elements with respect to compressed air manifolds, the elements serve as seals with any leakage of air tending to lessen the friction and, also, increasing the tension of the tape between the two annular elements.

Other objects and advantages of the invention will be apparent in the following description and claims considered together with the accompanying drawings, in which:

Figure 1:
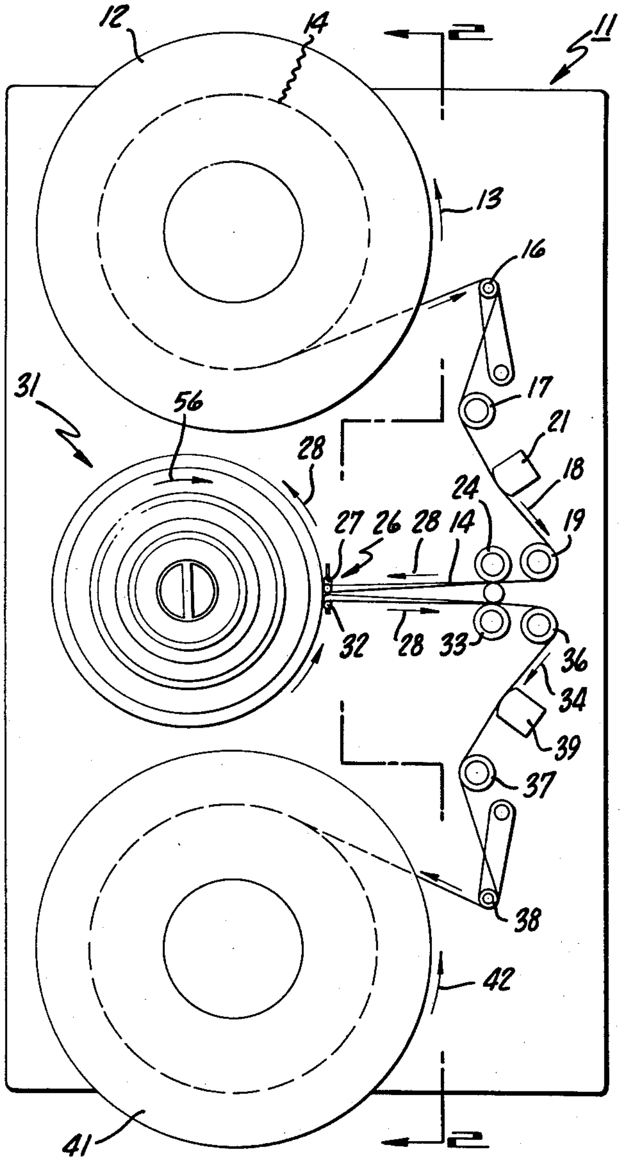
FIGURE 1 is a schematic diagram of a magnetic tape recorder, with which the present invention may be used.

In FIGURE 1 of the drawings, there is shown the general structure of a magnetic tape recorder 11 in accordance with the present invention. Thus, a supply reel 12 suitably mounted for counterclockwise rotation, as indicated by the arrow 13, supplies magnetic tape 14 to two tandem operated pulleys 16 and 17, in the conventional manner. From the latter pulley 17 the tape 14 proceeds in the direction of the arrow 18 to a feed pulley 19, with an intermediately disposed video erase head 21 operating on the tape 14. From the feed pulley 19 the tape 14 proceeds angularly in the direction of the arrow 22 between a capstan 23 and a first pressure roller 24, over an inclined post system 26, and thence about another guide post 27 to proceed peripherally in a counterclockwise direction, as indicated by arrow 28, about a support cylinder 31. The take-off of the tape 14 from the cylinder 31 is accomplished by a guide post 32, adjacent to the guide post 27, and the tape is trained from the guide post 32 between the capstan 23 and another pressure roller 33, after passing through the inclined post system 26. Thereafter, the tape 14 proceeds in the direction of the arrow 34 by way of a pulley 36 to a second pair of tandem pulleys 37 and 38 with audio or control track magnetic heads 39 disposed intermediately therebetween. From the tandem pulleys 37 and 38 the tape 14 is wound counterclockwise on a take-up reel 41, as indicated by the arrow 42.

Figure 2:
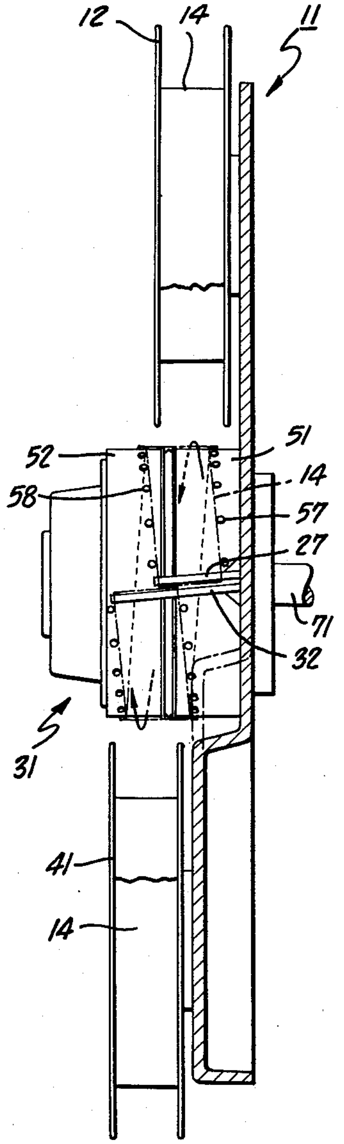
FIGURE 2 is an elevation of the guide cylinder of FIGURE 1.

For a scanning type recording with the foregoing structure, the support cylinder 31 is divided into two portions 51 and 52, as shown in FIGURE 2 of the drawings. Such two cylinder portions 51 and 52 are mounted in fixed and spaced relation with a slot 53 therebetween. The slot 53 is extended transverse to the longitudinal axis 54 of the cylinder 31 with a drum 55 centrally mounted for clockwise (as viewed in FIGURE 1) rotation, as indicated by arrow 56. To guide the magnetic tape 14 helically about the support cylinder 31, each of the two portions 51 and 52 thereof is provided with a plurality of guide posts 57 and 58, respectively. The surface of the cylinder 31 may be considered to be a support surface for the tape 14. The guide posts 57 and 58 are spiraled about the periphery of each portion 51 and 52 of the support cylinder 31 to provide a helical movement of the tape 14 about the cylinder. The distance spanned by the pins 58 and 57, across the slot 53, is substantially equal to the width of the magnetic tape 14. Thus, as the tape 14 is moved helically about the support cylinder 31, a magnetic head (not shown in detail) carried by the drum 55 in the opposite direction 56 records information on the magnetic tape 14 continuously along successive angular paths on the tape. The magnetic head or transducer includes a transducer surface which is in operative relation or contact with the tape 14.

Figure 3:
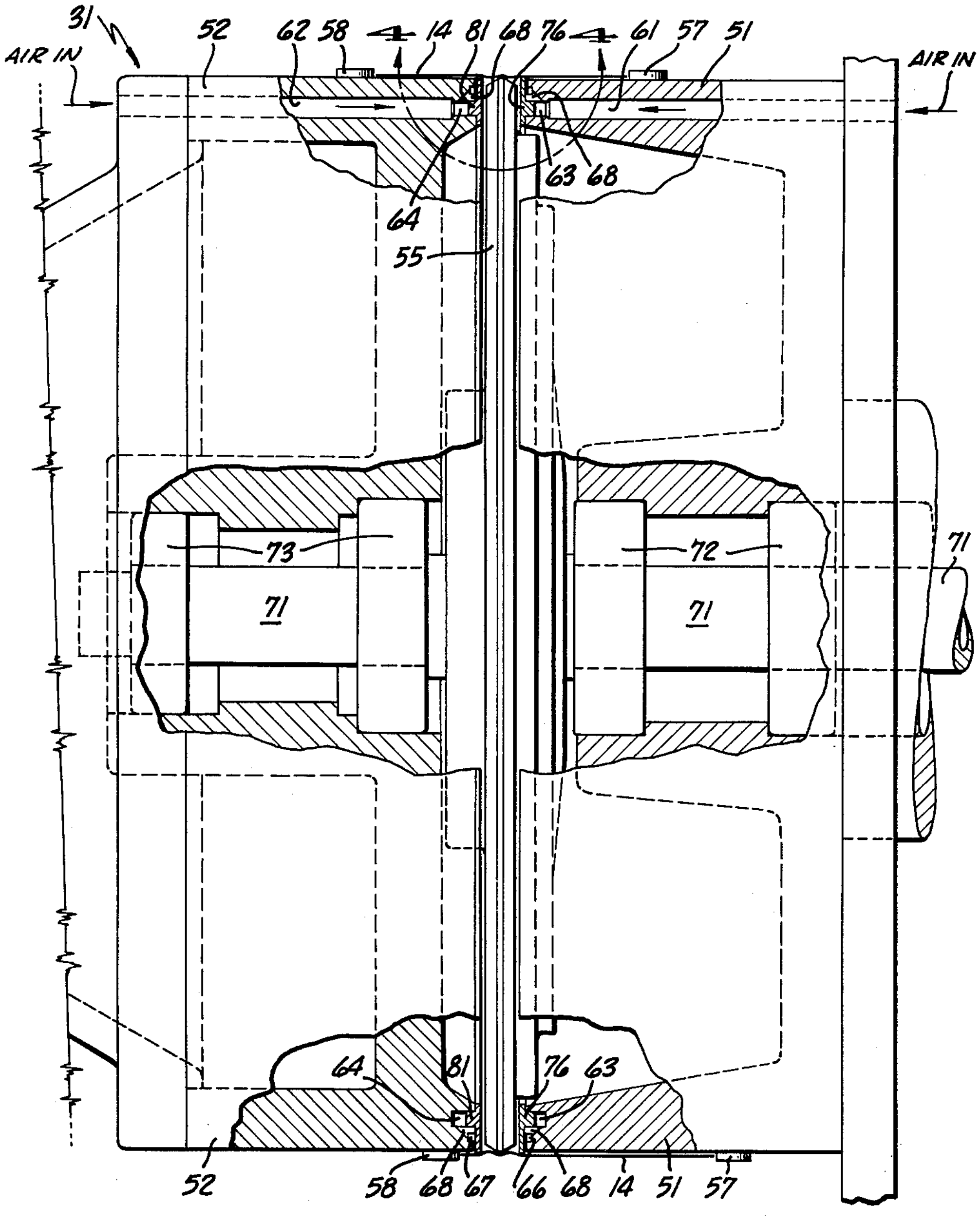
FIGURE 3 is a cross section of the guide cylinder of FIGURE 1, as taken along the line 3—3 thereof.
Figure 4:
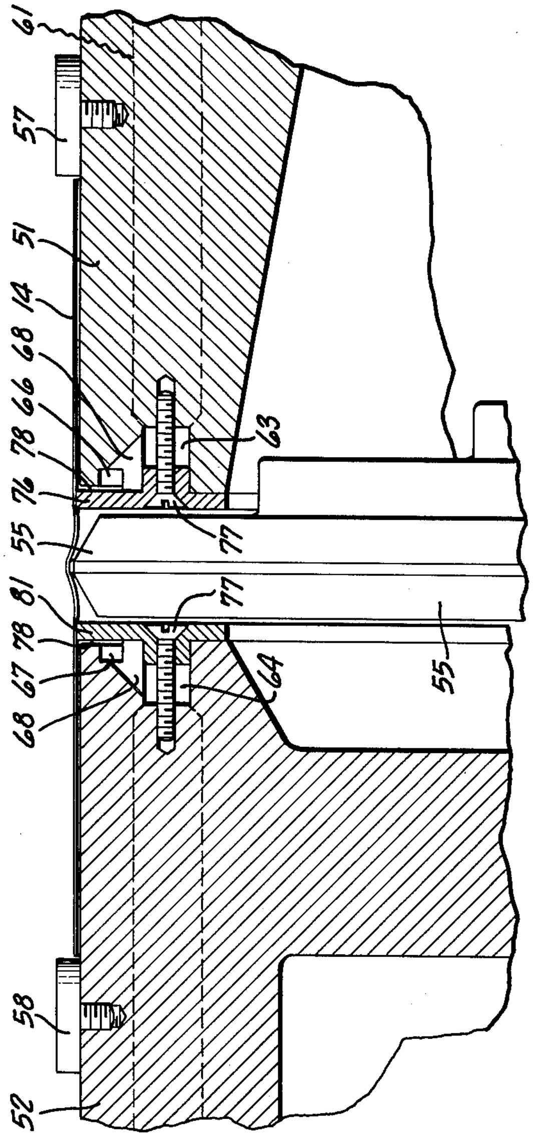
FIGURE 4 is an enlarged partial view taken along the line 4—4 of FIGURE 3.

If it is desired to minimize friction between the surface of the support cylinder 31 and the tape 14 in the area of the recording head, channels 61 and 62, respectively, are made to connect compressed air from a source (not shown) to manifolds 63 and 64 of the two cylinder portions 51 and 52, as shown in FIGURE 3. The manifolds communicate with distributor manifolds 66 and 67 through openings 68 (best shown in FIGURE 4). The compressed air from the distributor manifolds 66 and 67 then exerts a force against the tape 14 and a film of air supports the tape above the support cylinder 31. With the structure described thus far, the pressure of the record head against the tape 14 in addition to the pliance of the tape results in nonuniform recording conditions.

With the magnetic tape 14 transported in one direction about the periphery of the support cylinder 31, as indicated by the arrow 28 of FIGURE 1, the magnetic recording head is rotated on the drum 55 in the opposite direction, as indicated by the arrow 56. For rotation of the drum 55 a driven shaft 71 with the drum mounted transversely thereon is mounted axially within the support cylinder 31 by means of roller bearings 72 and 73, respectively, and the races therefor.

In order to eliminate nonuniform recording conditions substantially, the addition of structure is required to overcome the effect of the pliant nature of the tape 14 without adding any substantial friction losses to the system. Thus, with reference to the enlarged detail section of FIGURE 4, a thin annular flange 76 is suitably mounted, as by screws 77, within the slot 53 against the first portion 51 of the support cylinder 31. The peripheral portion of the flange 76 protrudes beyond the support surface for the tape 14 defined by the cylinder 31 for a substantially short distance to engage the magnetic tape 14. Also, the inner portion of the flange 76 extends over the distribution manifold 66 and main manifold 63 to provide a seal therefor. The distribution manifold 66 is vented by a circumferential channel 78 extending from the manifold between the flange 76 and the first cylinder portion 51 to the area of the tape 14. A similar annular flange 81 is mounted in the same manner on the second cylindrical portion 52, thus to protrude from the support surface on the opposite side of the drum 55.

In accordance with the foregoing, the two flanges 76 and 81 support the tape 14 on either side of the recording head of the drum 55. Compressed air flowing outwardly from the channels 78 provides an air film extending from the flanges 76, 81 to the adjacent side of the tape 14 between the tape and the surface of the two cylinder portions 51 and 52. The two flanges 76 and 81 serve to locally tense the tape 14 across the recording head of the drum 55 and, thereby, effectively reduce the pliance of the tape where contacted by the recording head for a uniform recording condition. The combination of the air film and the thin surfaces of the two flanges 76 and 81 in contact with the tape 14 provides substantially frictionless contact between the tape and support cylinder 31.

Uniformity in recording and playback is therefore achieved because the face of the recording head which is in operative engagement or relation with the magnetic tape contacts what is essentially a uniform recording surface. The localized tensioning introduced by the protruding flanges in conjunction with the head and the support surface defined by the cylinder eliminates discontinuities which might otherwise arise. It will also be recognized that the same considerations apply to the use of this combination in other contexts, such as those in which tape is moved directly across a recording head instead of being wound helically around a drum. The coaction between the flange elements, the head and the associated support surface for the tape would remain the same as long as the pliant nature of the tape caused problems in recording with uniformity.

Uniform recording conditions have been achieved by way of example, with a magnetic tape 14 having a two inch width when the two flanges 76 and 81 extended about 0.004 inch beyond the surface of the support cylinder 31, which had a diameter of eight inches. Also, the distance between the two flanges was, for example, one-half inch and the thickness of the flanges was 0.05 inch. Thus, the two flanges 76 and 81 cause the tape 14 to be taut across the recording head to provide a more uniform contact therebetween than was previously possible. Additionally, the narrow width of the flanges 76 and 81, in combination with the manner of floating the tape 14 on a film of air provided a minimum of friction between the tape and the support cylinder 31.

There has been described a means for providing stabilization of a pliant magnetic tape in the region of a recording head to afford uniform contact between a magnetic tape and a magnetic head.

What is claimed is:

1. A transducer arrangement for a pliant movable magnetic tape comprising: a support means for said tape; a magnetic transducer element disposed in contiguous relation with said tape; a pair of flange elements arranged in parallel with a predetermined plane and presenting a pair of tape-engaging edges conforming to a curved cylindrical surface normal to said plane, each of said flange elements being mounted adjacent to a different side of said transducer element and protruding a substantial distance from said support means; means for guiding said tape to and from said support means and flange elements with said plane at a substantial angle to every transverse plane of said tape; and means for tensioning the ends of said tape on either side of said pair of flange elements such that when said magnetic tape is moving along said support means, said tape is subjected to localized tensioning over said transducer element.

2. Transducing means for a movable magnetic tape having a pliant characteristic comprising the combination of: a tape support member defining a support surface for said magnetic tape; a magnetic transducer mounted within said support member, said transducer including a transducing surface facing in the same direction as said support surface; a pair of flange elements arranged in parallel with a predetermined plane and presenting a pair of tape-engaging edges conforming to a curved cylindrical surface normal to said plane, said flanges being mounted on said support member with said edges protruding a substantial distance from said support surface, each of said flange elements being positioned adjacent to a different side of said transducer; means for guiding said tape to and from said support means and flange elements with said plane at a substantial angle to every transverse plane of said tape; and means for tensioning the ends of said tape on either side of said pair of flange elements, each of said flange elements being disposed to provide localized tensioning of said magnetic tape across said transducing surface of said transducer.

3. A recording head arrangement for a pliant movable magnetic tape comprising the combination of: a support means along which said tape is to be moved; a recording head mounted contiguous to said tape intermediate its edges; a pair of flange elements arranged in parallel with a predetermined plane and presenting a pair of tape-engaging edges conforming to a curved cylindrical surface normal to said plane, said flanges being mounted on said support means with said edges protruding a substantial distance from said support means, each of said flange elements being between said recording head and a different edge of said tape; means for guiding said tape to and from said support means and flange elements with said plane at a substantial angle to every transverse plane of said tape; and means for tensioning the ends of said tape on either side of said pair of flange elements.

4. In a magnetic tape recorder having a fixed support means with a cylindrical surface supporting a movable magnetic tape across a peripheral slot along a helical path, and a recording head disposed for rotation within the slot, the combination comprising: first and second flange means mounted on said support means at either side of said slot to extend radially and for a substantial distance beyond said cylindrical surface; means for tensioning the ends of said tape on either side of said slot and flange means; and means coupled to said support means for respectively providing a film of air between said tape and said cylindrical surface from said first and second flange means to the adjacent lateral side of said tape.

5. In a magnetic tape recorder having a fixed support means with a cylindrical surface supporting a movable magnetic tape across a peripheral slot along a helical path, and a recording head disposed for rotation within the slot, the combination comprising: first and second thin annular flange elements mounted on said cylindrical surface adjacent to said slot to extend radially beyond said cylindrical surface for a substantial distance and contact said tape on either side of said recording head; means for tensioning the ends of said tape on either side of said slot and flange elements; and means coupled to said support means for respectively providing a film of air between said tape and said cylindrical surface from said first and second flange elements to the adjacent lateral side of said tape.

6. In a magnetic tape recorder having a fixed support means with a cylindrical surface supporting a movable tape across a peripheral slot along a helical path and a recording head disposed for rotation within the slot with the head extended radially beyond the surface to contact the tape, the combination comprising: first and second thin annular flange elements mounted on the support means at either side of the slot to extend radially for a substantial distance beyond the cylindrical surface and contact the tape on either side of the recording head; means for tensioning the ends of said tape on either side of said slot and flange elements; and means including air passages coupled to the support means for providing a film of air to the side portions of the tape between the tape and cylindrical surface from each of the elements to the adjacent lateral edge of said tape.

7. In a magnetic tape recorder having a fixed support means with a cylindrical surface supporting a movable tape across a peripheral slot along a helical path, and a recording head disposed for rotation within the plane of the slot to contact the tape, the combination comprising: first and second thin annular plates respectively mounted along an inner surface of a side structure of said slot to provide flanges extended beyond the cylindrical surface of said support means; first and second manifolds for distributing compressed air within said support means respectively disposed on either side of said slot; and first and second passages respectively communicating with said first and second manifolds and with said cylindrical surface along said first and second annular plates to provide a film of air between said tape and cylindrical surface from said annular plates to the adjacent lateral edge of said tape.

References Cited in the file of this patent

UNITED STATES PATENTS

| | | |
|---|---|---|
| 2,912,518 | Maxey | Nov. 10, 1959 |
| 2,921,144 | Martin | Jan. 12, 1960 |

FOREIGN PATENTS

| | | |
|---|---|---|
| 927,999 | Germany | Apr. 28, 1955 |